Figure 1:
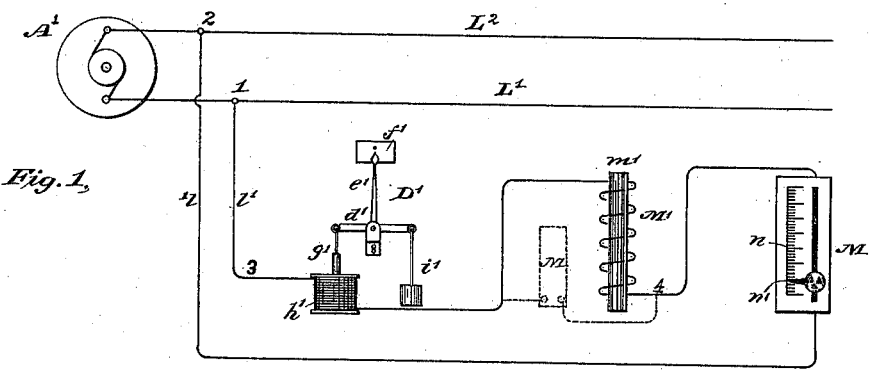

(No Model.)

O. B. SHALLENBERGER.
ELECTRICAL INDICATOR.

No. 383,669. Patented May 29, 1888.

WITNESSES:

INVENTOR,
O. B. Shallenberger
by
Pope Edgcomb & Terry Att'ys.

United States Patent Office.

OLIVER B. SHALLENBERGER, OF ROCHESTER, ASSIGNOR TO THE WESTINGHOUSE ELECTRIC COMPANY, OF PITTSBURG, PENNSYLVANIA.

ELECTRICAL INDICATOR.

SPECIFICATION forming part of Letters Patent No. 383,669, dated May 29, 1888.

Application filed January 21, 1888. Serial No. 261,467. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Electrical Indicators, (Case 169,) of which the following is a specification.

The invention relates to the class of apparatus employed for indicating the strength of current upon an electric circuit.

The object of the invention is to provide convenient, effective, and reliable means for determining the difference of potential existing between two given points in an electric circuit supplied with alternating, intermittent, or pulsatory electric currents. It is well known that the value of a given electric current is proportional to the electro-motive force to which it is due, divided by the resistance which it encounters. If, therefore, the resistance is decreased at the same time that the electro-motive force is increased, or vice versa, then the current flowing will increase or decrease at a rate greater than the increase or decrease of the electro-motive force. The present invention aims to substitute for such variable resistances a variable counter electromotive force, the amount of which is dependent upon the variations in the difference of potential to be determined. A circuit having an appreciable self-induction, when traversed by alternating, intermittent, or pulsatory electric currents, opposes a counter electro motive force varying in the manner required for this purpose—that is to say, as the current traversing it increases the apparent resistance, due to self-induction, diminishes, and vice versa, although the actual specific resistance remains constant.

It is possible to give to inductive devices of different forms of proportions different rates of increase or decrease of current under the influence of the same variations in the difference of potential, and therefore a current traversing two such inductive resistances in series or parallel will produce a combined effect different from that in either acting separately.

In general terms the invention may be described as follows: An electric conductor having a high self-induction is connected between the points at which it is desired to determine the difference of potential, and also an adjustable resistance and a solenoid or electro-magnet or other suitable means for operating the indicating device. Now, as the current through these devices increases, the counter electromotive force developed by reason of the self-induction also increases, but in gradually decreasing ratio. This variation is proportional to the variation in the electro-motive force, and for this reason the variation of current through the circuit is greater than the variation of electro-motive force. Thus it will be understood that slight variations in the difference of potential will be much more readily indicated. Variable resistances in the form of incandescent electric lamps have been employed for similar purposes; but certain objections are found to their use. For instance, they are fragile, they do not permit of such ready adjustment as the self-inductors, and, even after careful adjustment, are liable to change greatly in resistance, and so render the indications of the instrument valueless. By the use of this invention, fixed or adjustable resistances may be employed throughout, so that the liability to change is reduced to a minimum, while at the same time even greater sensitiveness may be obtained than by the employment of a varying resistance.

In an application of even date herewith, Serial No. 261,471, the method here shown is claimed.

Figure 2:
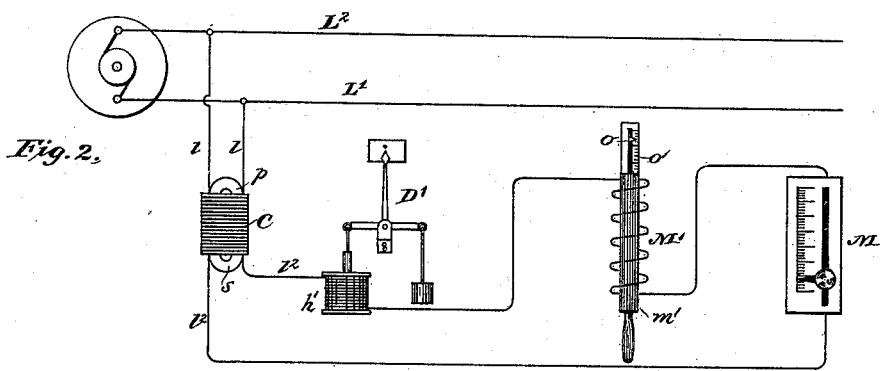
Figure 3:
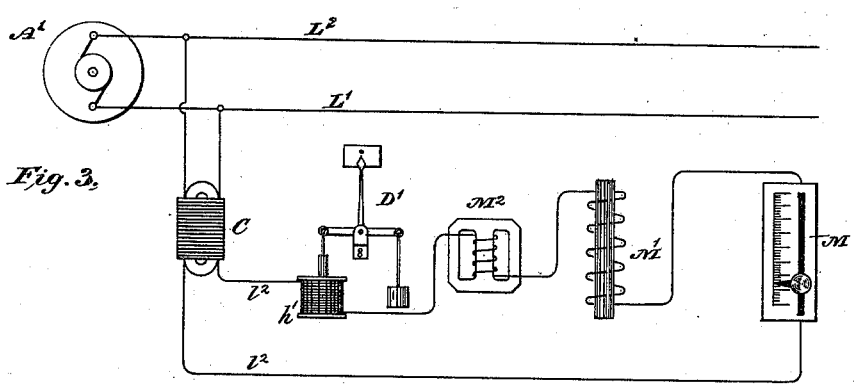

In the accompanying drawings, Figure 1 is a diagram illustrating an organization of apparatus for carrying out the invention. Figs. 2 and 3 illustrate modifications.

Referring to Fig. 1, A' represents a suitable source of alternating, intermittent, or pulsatory electric currents; L' L², the main lines leading to any suitable work-circuit. Between the lines L' and L² there is connected the indicating apparatus to be described. This consists, in this instance, of an indicator, D', here shown as consisting of a lever, d', carrying a pointer, e', applied to a scale-plate, f'. From one end of the beam $d'$ there is suspended a core, $g'$, extending into a solenoid, $h'$. A counterpoise, $i'$, is suspended from the opposite end of the beam $d'$. The solenoid $h'$ is included in a conductor, $l'$, extending from the line L' to the line L², being connected therewith at points 1 and 2. A coil, M', of high self-induction, is included in series with the coil $h'$. This coil M' is provided with a core, $m'$, of soft iron. This core, as also the core $g'$, is preferably made up of fine soft-iron wires or laminæ of soft iron. An adjustable resistance, M, is also included in series with the coils M' and $h'$.

The method of determining the electromotive force is simply to establish a given normal current through the coil M', of high self-induction, by placing a fixed difference of potential upon it and noting the amount of resistance which must be introduced into the circuit in order to establish this normal difference of potential—that is to say, the instrument will only balance, bringing the pointer $e'$ at the center of the plate $f'$, when a certain predetermined difference of potential is maintained between the points 3 and 4 upon the opposite sides of the coil M' and solenoid $h'$, the additional difference of potential existing at the terminals of the resistance M being determined by the position of the indicator $n'$ upon the scale $n$.

The resistance M may be included in shunt upon the self-inductor M', as shown in dotted lines, in some instances.

The effect of the self-induction device is to render the instrument much more sensitive than would be the case if a fixed resistance were employed, for, as has been pointed out, its apparent resistance decreases as the electro-motive force increases. If the rate of alternations of or periodic changes in the current should remain approximately the same, no adjustment of the resistance M is necessary in order to insure the accurate operation of this instrument. This condition is fulfilled in those systems of electric distribution where all the machines are intended to run at approximately the same number of alternations per minute—say sixteen thousand; but where there are slight variations in the number of alternations of the current the self-induction will vary with the rate of alternation, as well as with the electro-motive force; but the adjustable-resistance device M may be used as a correction for the slight variations thus occasioned. The error due to this cause is usually very small; but in some instances this adjustment may be desirable.

In Fig. 2 a modification is shown wherein the amount of self-induction in the circuit can be varied. This can be accomplished by moving the core $m'$ of the self-induction device M' within its coil, an indicator, $o$, being applied to a scale, $o'$, and moving with the core. The resistance M and device D' are included in the circuit, as before. In this instance a converter, C, is interposed between the lines $l\ l$ and $l^2\ l^2$, the former being connected from the line L' to the line L² through the primary coil $p$ of the converter. The conductor $l^2$ is connected through the secondary coil $s$ and the devices M', M, and D'. The converter serves to reduce the current in any required proportion, so as to make it more convenient for handling.

The adjustment of the device M' serves, also, to correct for the variations in the rate of alternations, if it is so desired.

In Fig. 3 there is shown an organization by means of which slight changes in the rate of alternation may be compensated for automatically. Two self-induction devices, M' and M², of different forms, are employed, and they may be so proportioned that while an increase in the number of alternations may increase the self-induction of one it will have the opposite effect upon the other. It is a well-known property of coils possessing a self-induction in which an iron core is present that there is a particular point at which the self-induction remains approximately constant through a considerable change in the rate of alternations, while it decreases both above and below this point. It is therefore necessary to suitably proportion the two coils and use one above its particular approximately-constant point and the other below such point, in order to compensate, within certain limits, for the error due to changes in the rate of alternation. The coil of the indicating apparatus $h'$ may be utilized in certain cases for this purpose by making it of suitable form and proportion, thus dispensing with the use of a separate compensating-coil.

The two coils M' and M² might be connected in parallel with each other in the same manner as the coil M' and the resistance M in Fig. 1.

Any convenient form of indicating device may be employed in place of the one shown— as, for instance, a Siemens electro-dynamometer.

I claim as my invention—

1. The combination of an electrical indicator for alternating, intermittent, or pulsatory electric currents and a conductor of high self-inductive qualities whose coefficient of self-induction decreases with an increase of applied potential in circuit with such indicator, whereby the sensitiveness of the instrument is increased.

2. The combination of an electric indicator for alternating, intermittent, or pulsatory electric currents and an adjustable self-inductive device whose coefficient of self-induction decreases with an increase of applied potential in circuit with said indicator, whereby the sensitiveness of the instrument is increased.

3. An electric indicator for alternating, intermittent, or pulsatory electric currents, consisting of an indicating device acted upon by electric currents, a self-inductive device, and an adjustable resistance in circuit therewith.

4. An electric indicator for alternating, intermittent, or pulsatory electric currents, consisting of an indicating device affected by such currents, and two or more self-inductive devices having different coefficients of self-induction in circuit therewith.

In testimony whereof I have hereunto subscribed my name this 10th day of January, A. D. 1888.

OLIVER B. SHALLENBERGER.

Witnesses:
W. D. UPTEGRAFF,
DANL. W. EDGECOMB.